US012648067B2

(12) United States Patent     (10) Patent No.:   US 12,648,067 B2

Almehio et al.     (45) Date of Patent:     Jun. 2, 2026

(54) METHOD FOR CONTROLLING AN AUTOMOTIVE LIGHTING DEVICE

(71) Applicant: VALEO VISION, Bobigny (FR)

(72) Inventors: Yasser Almehio, Bobigny (FR); Hafid El Idrissi, Bobigny (FR)

(73) Assignee: Valeo Vision, Bobigny (FR)

( * ) Notice: Subject to any disclaimer, the term of this patent is extended or adjusted under 35 U.S.C. 154(b) by 323 days.

(21) Appl. No.: 18/547,706

(22) PCT Filed: Feb. 22, 2022

(86) PCT No.: PCT/EP2022/054441

§ 371 (c)(1),
(2) Date: Aug. 24, 2023

(87) PCT Pub. No.: WO2022/180054

PCT Pub. Date: Sep. 1, 2022

(65) Prior Publication Data

US 2024/0130025 A1     Apr. 18, 2024

(30) Foreign Application Priority Data

Feb. 26, 2021    (FR) ........................................ 2101885
Jul. 20, 2021    (FR) ........................................ 2107801

(51) Int. Cl.
| | |
|---|---|
| *H05B 47/125* | (2020.01) |
| *B60Q 1/14* | (2006.01) |
| *G06T 7/00* | (2017.01) |
| *G06T 7/149* | (2017.01) |
| *G06V 10/44* | (2022.01) |
| *G06V 10/82* | (2022.01) |
| *G06V 20/58* | (2022.01) |

(52) U.S. Cl.
CPC ........... *H05B 47/125* (2020.01); *B60Q 1/143* (2013.01); *G06T 7/0002* (2013.01); *G06T 7/149* (2017.01);
(Continued)

(58) Field of Classification Search
CPC ...... H05B 47/125; B60Q 1/143; G06T 7/149; G06T 2207/20084; G06T 2207/30252;
(Continued)

(56) References Cited

U.S. PATENT DOCUMENTS 8,750,567 B2    6/2014   Zhang et al.
2013/0266175 A1*   10/2013   Zhang .................. G06V 10/457
                     382/103
(Continued)

FOREIGN PATENT DOCUMENTS

EP        2747027 A1    6/2014
EP        3882076 A1    9/2021
WO    WO-2020100638 A1 *   5/2020       G06V 20/58

OTHER PUBLICATIONS

European Patent Office, International Search Report and Written Opinion of corresponding International Application No. PCT/EP2022/054441, dated Jul. 7, 2022.
(Continued)

*Primary Examiner* — Andrew M Moyer
*Assistant Examiner* — Conor A O'Malley
(74) *Attorney, Agent, or Firm* — Valeo Vision

(57)            ABSTRACT

A method for controlling an automotive lighting device. The method includes projecting a first light pattern, capturing an image of a region in front of the lighting device, obtaining a luminance map from the captured image, identifying objects in the luminance map and classify them as reliable or not reliable, according to at least one reliability criterion and modifying the first light pattern to modify the luminous intensity in at least one zone intended to project light on a non-reliable object.

12 Claims, 4 Drawing Sheets

(52) U.S. Cl.
CPC ............ *G06V 10/454* (2022.01); *G06V 10/82* (2022.01); *G06V 20/58* (2022.01); *B60Q 2300/45* (2013.01)

(58) Field of Classification Search
CPC .... G06V 10/454; G06V 20/58; G06V 10/145; G06V 10/44
See application file for complete search history.

(56) References Cited

U.S. PATENT DOCUMENTS

| | | | |
|---|---|---|---|
| 2016/0012278 A1* | 1/2016 | Banhazi | G06V 10/44 |
| | | | 382/110 |
| 2020/0406874 A1* | 12/2020 | Chang | G02F 1/155 |
| 2021/0209754 A1* | 7/2021 | Mishra | G06T 7/90 |

OTHER PUBLICATIONS

Liu Taocheng et al, "Combining Convolutional Neural Network and Support Vector Machine for Gait-based Gender Recognition", (2018) Chinese Automation Congress (CAC), IEEE, (Nov. 30, 2018), doi:10.1109/CAC.2018.8623118, pp. 3477-3481, China.
Mohamed A Helala et al, "Road Boundary Detection in Challenging Scenarios", Advanced Video and Signal-Based Surveillance (AVSS), (2012) IEEE Ninth International Conference on, IEEE, (Sep. 18, 2012), doi:10.1109/AVSS.2012.61, ISBN 978-1-4673-2499-1, pp. 428-433, Canada.

* cited by examiner

6

5

METHOD FOR CONTROLLING AN AUTOMOTIVE LIGHTING DEVICE

TECHNICAL FIELD

This invention is related to the field of automotive lighting devices, and more particularly, to the control thereof in low visibility conditions.

BACKGROUND OF THE INVENTION

Automotive luminous devices comprise light sources, so that the lighting device may provide some light, either for lighting and/or signaling. Several types of light sources families are used nowadays, all of them having advantages and disadvantages.

In some low visibility scenarios, more light is needed so that the user of the vehicle (or the sensor in the event of an autonomous driving situation) may clearly identify any person or object that is on the road, so that the user may react properly.

However, this light addition may introduce other visibility problems, such as self-glaring or dazzling to other vehicles.

A solution for this problem is therefore sought.

SUMMARY OF THE INVENTION

The invention provides a solution for these problems by means of a method for controlling an automotive lighting device, the method comprising the steps of projecting a first light pattern;

capturing an image of a region in front of the lighting device;

obtaining a luminance map from the captured image;

identifying objects in the luminance map and classify them as reliable or not reliable, according to at least one reliability criterion; and modifying the first light pattern to modify the luminous intensity in at least one zone intended to project light on a non-reliable object.

With such a method, the lighting device may provide a way of improving the visibility of the zone in front of the vehicle by identifying the visibility problem of each object. The visibility may be adversely affected by low visibility conditions and/or by excessively reflective surfaces, such as a wet road, etc.

A sensor for autonomous driving or the human eye would need the help of this method for a better identification of the objects located in the way of the vehicle.

In some particular embodiments, the step of capturing the image is carried out by a luminance sensor, so that the luminance map is directly obtained when the image is captured.

A luminance camera is expensive, but if offers a luminance map directly, without the need of converting the original image in a luminance map, which is also possible, according to known methods, such as the one shown in Bellia, Laura & Spada, Gennaro & Pedace, Alessia & Fragliasso, Francesca. (2015). Methods to Evaluate Lighting Quality in Educational Environments. Energy Procedia. 78. 3138-3143. 10.1016/j.egypro.2015.11.770.

In some particular embodiments, the method further comprises the step of sub-classifying the non-reliable objects in dark objects of overexposed objects.

Dark objects would need an increase in the luminous intensity employed to light them, while overexposed objects would need less light so that the shape of the object may be more clearly appreciated. The method of the invention detects these two types of non-recognizable objects so that it may adapt the first light pattern to each situation. In some particular embodiments, the step of modifying the first light pattern includes increasing the light in the zone of a dark object and/or decreasing the light in an overexposed object.

In some particular embodiments the method further comprises the step of identifying contours before the step of identifying objects;

the step of identifying objects comprise grouping contours in sets, so that each set of contours is defined as an object; and each reliability criterion includes choosing one reliability feature and compare the value of this reliability feature in each contour with the sum of the mean value plus one standard variation of this reliability feature in the whole set of contours.

In these particular cases, the reliability criterion is based on some features of the contour of the objects. The objects are identified by first identifying the contours and then grouping the contours in objects by their proximity or continuity. Some features may be easily quantified in the contours, and the evaluation of these features is used to check the reliability of the object.

In these cases, the criterion is related to the relative quantification of the features with respect to the value of these features in the rest of the contours. A statistic arrangement of the quantification of the features will define a mean value and a standard variation value for each feature. Those contours which has a value which is higher than the sum of said mean value plus said standard variation are considered to be reliable.

The contour detection may be performed by an available method, such as the Laplace coefficient or the Gaussian difference.

In some particular embodiments, the reliability feature comprises at least one of the shape, the size and the contrast of said contours.

The reliability may be measured in n-dimensions. In some cases, the reliability is accepted when the value of two or more features are comprised in the reliability zone defined by the mean value and the standard deviation. The shape, the size and the contrast of the contours are magnitudes which are easily quantifiable in the luminance map, so the statistic arrangement of the data may be easily built.

In some particular embodiments, the step of identifying the objects is carried out by dividing the luminance map according to contours, and evaluating each contour according to the reliability criterion.

In some particular embodiments, the step of modifying the first light pattern comprises evaluating the luminance in a non-reliable object; and if the luminance in a first contour of the non-reliable object is lower than a predetermined threshold, increasing the luminous intensity in a zone of the first light pattern corresponding to the first contour, with an intensity proportional to the luminance of that zone.

This is the way to react to a non-reliable object when the sensor is a sensor for autonomous driving, and the object has a low visibility. The luminance provided by the luminance map for each contour is chosen as the criterion for a correct visibility. Since each sensor defines the predetermined luminance threshold, to discern whether an object or part of an object can be properly identified by said sensor, the method identifies which zones should be more illuminated by increasing the luminous intensity of the lighting device.

In some particular embodiments, the method further comprising a step of filtering the luminance map after the step of obtaining the luminance map.

With a previous step of filtering the luminance map, most noisy features are eliminated from the image, so that it may be more clearly appreciated.

In some particular embodiments, the step of filtering comprises performing a luminous intensity histogram equalization.

This histogram equalization is useful to obtain a greater luminous information of the objects involved in the image.

In some particular embodiments, the step of filtering comprises performing a contrast sensitivity function suitable to discern if a contour is seen by the human eye or not.

A contrast sensitivity function is a function intended to identify the contrast of the contours to discern whether they may be seen by the human eye or not. There are different examples of contrast sensitivity functions that would be used in these embodiments, so that a contour (and then, the object associated to this contour) may be classified as reliable or non-reliable.

In some particular embodiments, an object is classified as non-reliable according to a machine learning process. In more particular embodiments, the machine learning process comprises training the lighting device to perform the step of classifying the objects as reliable or non-reliable, by providing a training dataset of reliable and non-reliable objects. In more particular embodiments, the machine learning process comprises the use of an activation function from at least one of Softntax, ReLU, LeakyReLU, Sigmoid or Tanh.

In a second inventive aspect, the invention provides an automotive lighting device comprising

- a plurality of light sources;
- a control unit configured to selectively control the activation of the plurality of light sources; and
- a camera configured to acquire images from the exterior of the lighting device;
- wherein the control unit is configured to carried out a method according to the first inventive aspect.

In some particular embodiments, the control unit comprises at least part of a convolutional neural network, wherein the convolutional neural network comprises a convolutional layer, a pooling layer and a machine vector support layer, the machine vector support layer being configured to classify the descriptors exiting from the convolutional neural network to optimize some weights used in the network.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

BRIEF DESCRIPTION OF DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DETAILED DESCRIPTION OF THE INVENTION

Figure 1:
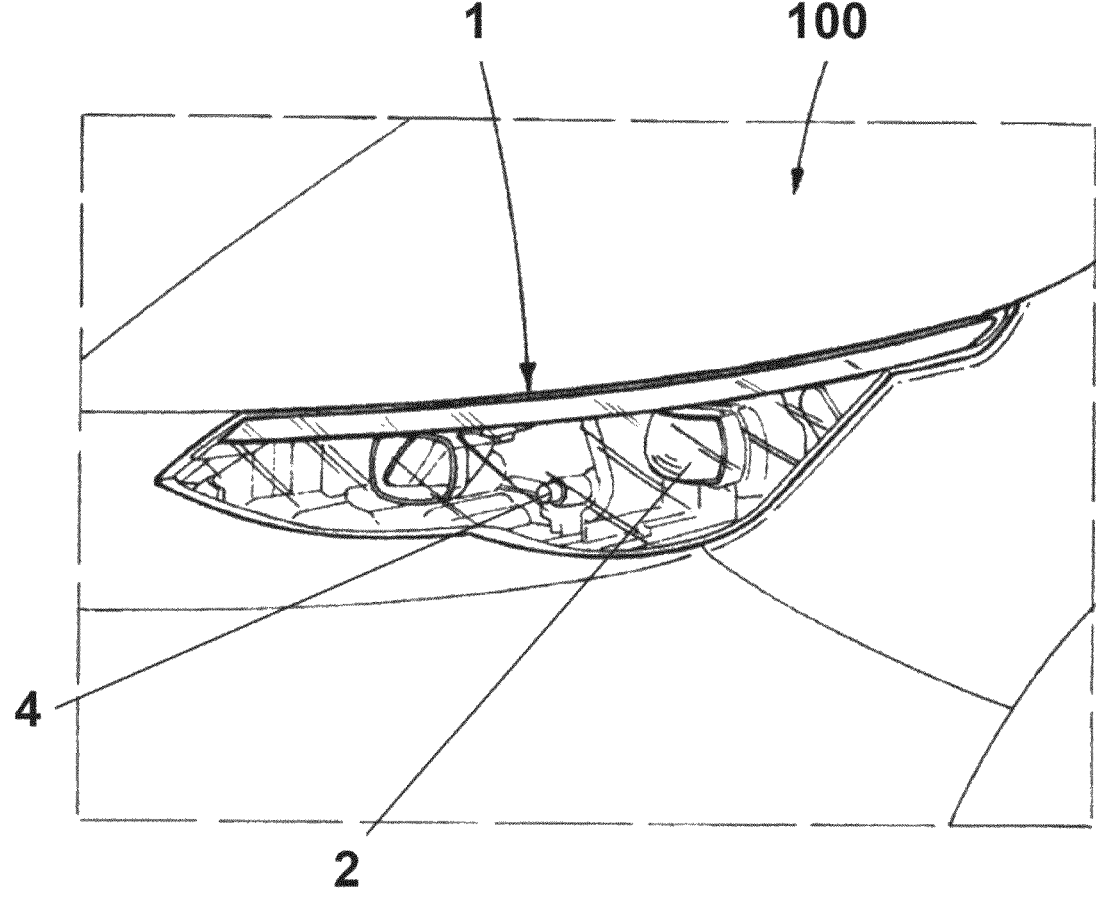
FIG. 1 shows an external view of an automotive luminous device according to the invention.

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive lighting device according to the invention.

This headlamp 1 is installed in an automotive vehicle 100 and comprises

- a matrix arrangement of LEDs 2, intended to provide a light pattern;
- a control unit 3 to perform a control of the operation of the LEDs 2; and
- a camera 4 intended to provide some external data.

This matrix configuration is a high-resolution module, having a resolution greater than 2000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometre.

The monolithic matrix is coupled to the control centre so as to control the generation and/or the projection of a pixelated light beam by the matrix arrangement. The control centre is thus able to individually control the light emission of each pixel of the matrix arrangement.

Alternatively to what has been presented above, the matrix arrangement may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control centre.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

A particular embodiment of the method of the invention comprises that a lighting device first projects a first light pattern, to light the road that is ahead. The automotive vehicle comprises sensors for autonomous driving, so the images must provide all necessary information for the sensors to detect and identify every object which is in the surroundings of the vehicle.

Then, the camera captures an image of this region in front of the automotive vehicle. This image is acquired and sent to a control unit, which obtains a luminance map from the acquired image. This luminance map could be directly obtained by a luminance camera in different embodiments, but it is less expensive to use a standard camera and then calculate the luminance map by a software.

Figure 2:
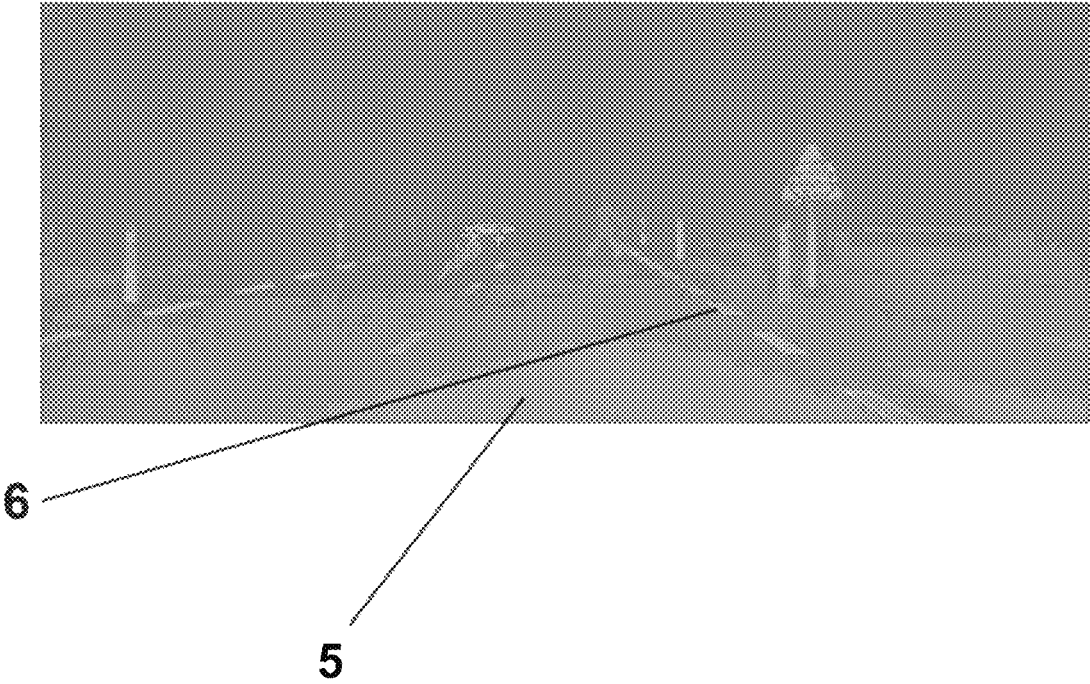
FIG. 2 shows a first luminance map as calculated by the software.

FIG. 2 shows a first luminance map 5 as calculated by the software. In this figure, the luminance map 5 provides the method with a plurality of contours 6. These contours 6 are analysed to verify some features of the same. Length and contrast are two features which will be very useful for the rest of this particular embodiment of the method.

In some particular embodiments, an intermediate step of histogram equalization is performed before the identification of contours, since a histogram equalization is particularly advantageous in this case, since it contributes for a better contour recognition.

Figure 3:
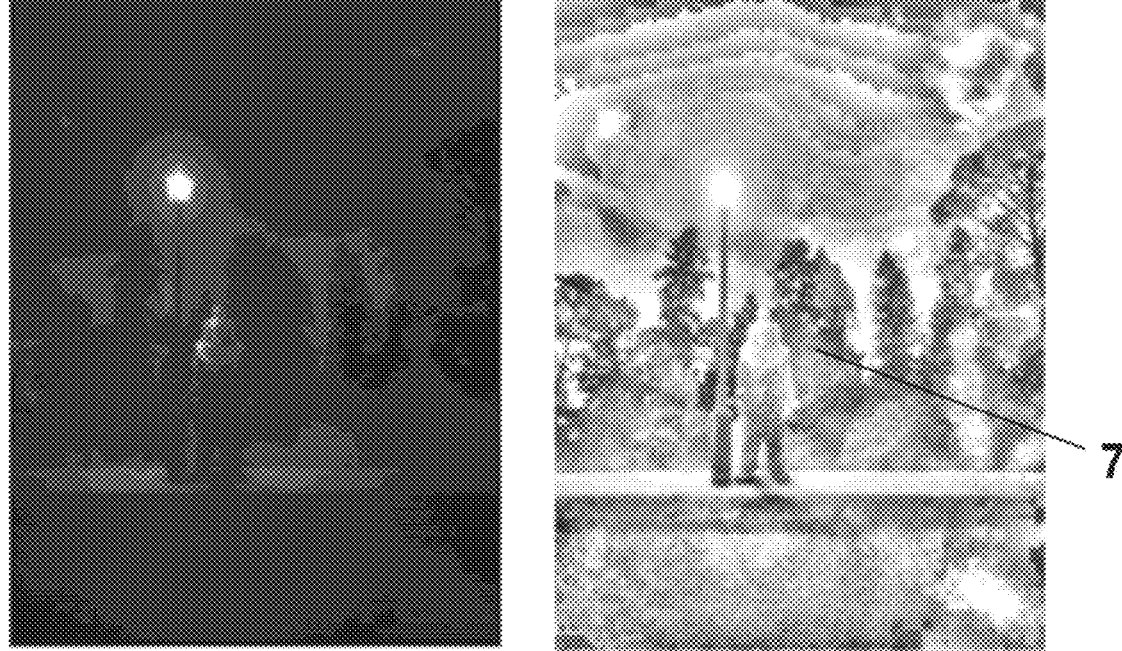
FIG. 3 shows an example of a local histogram equalization.

FIG. 3 shows an example of a local histogram equalization 7. Although in this figure it is shown from a real image, the histogram equalization may be also performed on the luminance map.

The histogram equalization allows a better recognition of contours by a re-scaling of the luminous intensity values in the figure. Since it is a very dark image, intensity values are comprised in a narrow interval. By re-scaling these values, much more details may be obtained from the original image. This can also be applied to luminance in a luminance map.

Returning to the method, once the contours have been identified, they are grouped by proximity to form objects. These objects are therefore formed by contours. The contours of an object may be classified as reliable or non-reliable. This classification has the origin in the ability of the sensors to identify clearly the object (a person, a tree, a dog, a fence, a traffic signal . . . ). A criterion for reliability is used for this classification.

Figure 4:
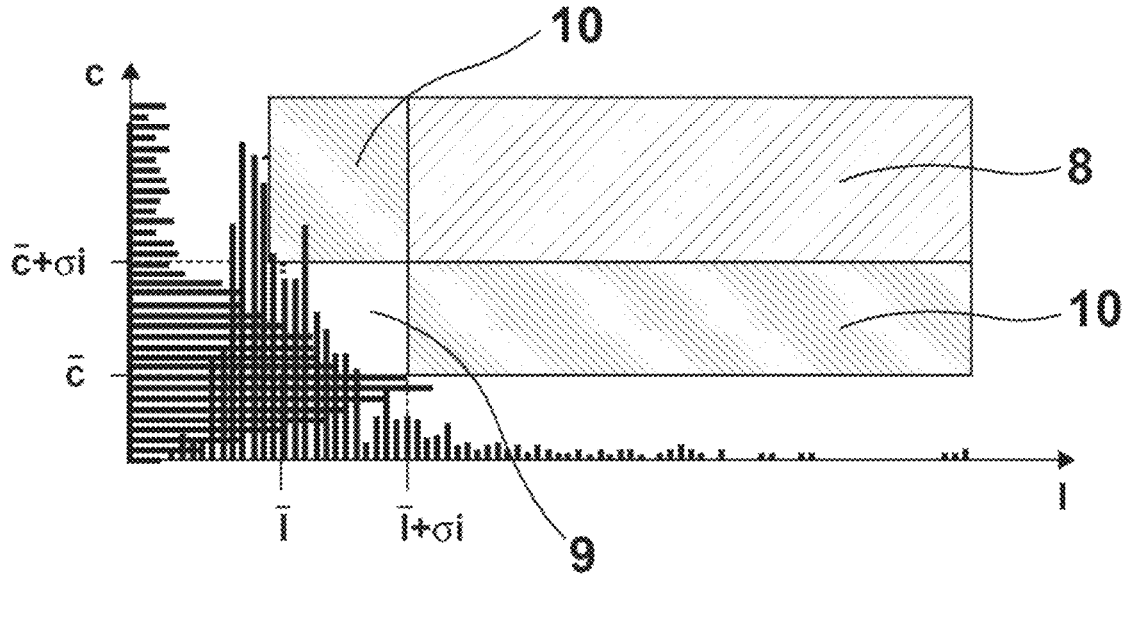
FIG. 4 shows the statistic distribution of the length and contrast values of these contours.

FIG. 4 shows the statistic distribution of the length and contrast values of these contours. Every contour has a length and a contrast value. With this statistic distribution, the mean value and the standard deviation are calculated for both features (length and contrast). Those contours having a contrast which is higher than the mean contrast value plus one standard deviation are considered to be "visible" and those contours having a length higher than the mean length value plus one standard deviation are considered to be "long". Those contours which are "visible" and "long" are considered to be reliable 8. Those contours which are "non-visible" and "non-long" are considered to be non-reliable 9. Contours which are "visible" but "non-long" or "non-visible" and "long" will be treated as non-reliable 10, but in a different manner.

Once the contours have been classified in reliable and non-reliable, a contour map is elaborated, where the contour of the non-reliable objects are identified.

The control unit has the information of which light pixels are in charge of lighting the non-reliable zones. When a non-reliable zone is detected, and the non-reliability is caused by a low lighting, the control unit controls the light pixels in charge of this zone to increase the luminous intensity so that the light provided to this dark zone is increased.

If the non-reliability comes from a glaring, the control unit controls the light pixels in charge of this zone to decrease the luminous intensity This method may be also applied to non-autonomous driving. In this case, there is an additional filtering step which is called contrast sensitivity function. A contrast sensitivity function is a function intended to identify the contrast of the contours to discern whether they may be seen by the human eye or not. There are different examples of contrast sensitivity functions that would be used in these embodiments, so that a contour (and then, the object associated to this contour) may be classified as reliable or non-reliable.

In some cases, while training the system, a machine learning algorithm is used for improving the reliability hierarchizing of objects. This machine learning process is carried out by a convolutional neural network.

Convolutional layers use filters to recall data from the acquired image, while pooling layers are used to perform a sampling process over the data obtained in the convolutional layers. This network is fully-connected (FC), so every input neuron is connected to every neuron of the next layer.

While the activation function may be chosen between Softmax, ReLU, LeakyReLU, Sigmoid or Tanh, there is an advantage in replacing the last activation layer by a machine vector support, which learns how to minimize the error in an adaptive way. The machine vector support layer is also configured to classify the descriptors exiting from the convolutional neural network to optimize some weights used in the network.

What is claimed is:

1. A method for controlling an automotive lighting device, the method comprising:

projecting a first light pattern;

capturing an image of a region in front of the lighting device;

obtaining a luminance map from the captured image;

identifying objects in the luminance map and classify them as reliable or not reliable, according to at least one reliability criterion by identifying contours and grouping contours in sets, so that each set of contours is defined as an object, where each reliability criterion includes choosing one reliability feature and compare the value of this reliability feature in each contour with the sum of the mean value plus one standard variation of this reliability feature in the whole set of contours; and modifying the first light pattern to modify the luminous intensity in at least one zone intended to project light on a non-reliable object.

2. The method according to claim 1, wherein capturing the image is carried out by a luminance sensor, so that the luminance map is directly obtained when the image is captured.

3. The method according to claim 1, further comprising sub-classifying the non-reliable objects in dark objects or overexposed objects.

4. The method according to claim 3, wherein modifying the first light pattern includes increasing the light in the zone of a dark object and/or decreasing the light in an overexposed object.

5. The method according to claim 1, wherein the reliability feature includes at least one of the shape, the size and the contrast of said contours.

6. The method according to claim 1, wherein identifying the objects is carried out by dividing the luminance map according to contours, and evaluating each contour according to the reliability criterion.

7. The method according to claim 1, wherein modifying the first light pattern includes evaluating the luminance around a non-reliable object; and if the luminance in a first contour of the non-reliable object is lower than a redetermined threshold, increasing the luminous intensity in a zone of the first light pattern corresponding to the first contour, with an intensity proportional to the luminance of that zone.

8. The method according to claim 1, further comprising filtering the luminance map after obtaining the luminance map.

9. The method according to claim 8, wherein filtering includes performing a contrast sensitivity function suitable to discern if a contour is seen by the human eye or not.

10. The method according to claim 1, wherein an object is classified as non-reliable according to a machine learning process.

11. The method according to claim 10, wherein the machine learning process includes training the lighting device to classify the objects as reliable or non-reliable, by providing a training dataset of reliable and non-reliable objects.

12. The method according to claim 11, wherein the machine learning process includes the use of an activation function from at least one of Softmax, ReLU, LeakyReLU, Sigmoid or Tanh.

* * * * *